M. D. PRICE.
WHEEL.
APPLICATION FILED FEB. 16, 1912.
1,045,743.
Patented Nov. 26, 1912.
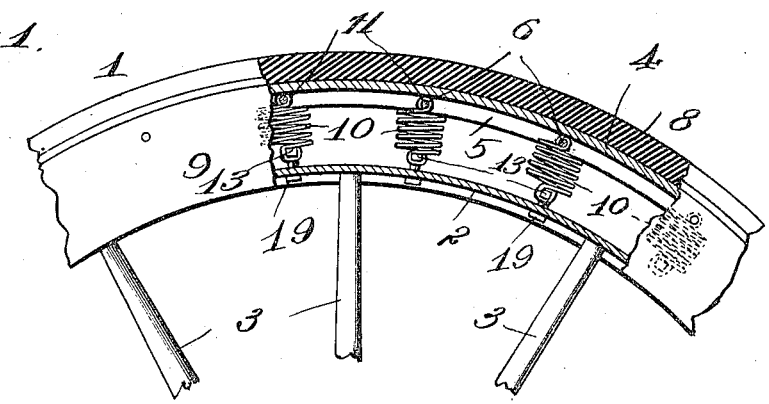
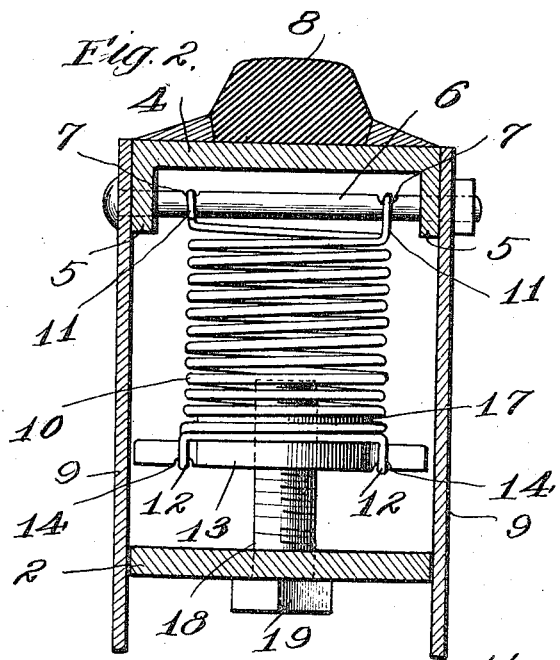
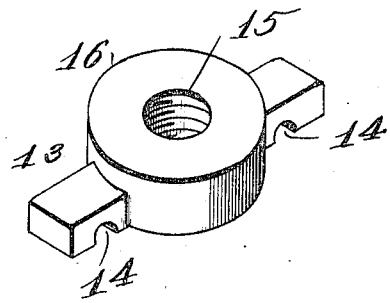
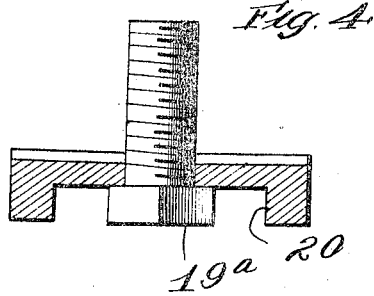
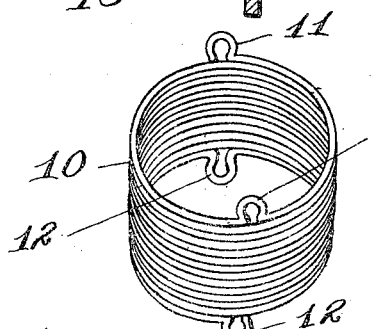
WITNESSES
INVENTOR
Mitchell D. Price
By Knight Bros.
Attorneys

UNITED STATES PATENT OFFICE.

MITCHELL D. PRICE, OF MIAMI, FLORIDA.

WHEEL.

1,045,743.

Specification of Letters Patent. Patented Nov. 26, 1912.

Application filed February 16, 1912. Serial No. 678,038.

*To all whom it may concern:*

Be it known that I, MITCHELL D. PRICE, a citizen of the United States, residing at Miami, in the county of Dade and State of Florida, have invented certain new and useful Improvements in Wheels, of which the following is a specification.

The object of my invention is to provide a wheel having an inner and an outer member with relative movement between the members and means secured between said members providing a cushion for one member upon the other; and with this and minor objects in view, my invention consists of the parts and combination of parts as will be hereinafter more fully set forth.

In the drawing—Figure 1 is an enlarged sectional view of a portion of a wheel embodying my invention; Fig. 2 is an enlarged detail sectional view of the wheel; Fig. 3 is a perspective view of the tension bar; Fig. 4 is a detail sectional view of another embodiment of my invention; and Fig. 5 is a perspective view of the spring.

The reference numeral 1 designates a wheel which, according to my invention, includes an inner rim 2, to which the spokes 3 of the wheel are rigidly secured.

4 represents the outer rim which, as shown in Fig. 2, is made preferably of channel metal; that is to say, the rim is provided with inwardly extending flanges 5 at each edge. 6 is a bolt secured in said flanges 5 and provided with seats 7 to be hereinafter referred to. The outer rim may be of any desired configuration on its exterior surface, but I prefer to secure to said outer rim, a solid rubber tire or tread 8.

9 are circular plates or flanges of ring construction, secured to the flanges 5 of the outer rim by means of the bolt 6, said plates extending, preferably, inwardly beyond the inner rim 2, as clearly shown in Fig. 2.

10 is a spring (preferably a coil spring), the upper coil of which is provided with two diametrically opposite eyes 11, which are seated in the seats 7 of the bolt 6, whereby the spring is firmly anchored to the outer rim 4. The lower coil of the spring is also provided with diametrically opposite eyes or hooks 12.

13 is a tension bar having a seat 14 near each end, in which the eyes or hooks 12 of the spring are secured as shown in Fig. 2. This tension bar is provided with a screw-threaded central opening 15. I prefer to construct the tension bar with a central enlargement 16, which projects in the direction of the coil spring and serves, to a greater or less degree, as a centering member for the coil spring 10. This central enlargement 16 includes the thickened portion 17, shown in Fig. 2, which not only serves as a centering member for the spring, but gives additional strength to the tension bar. The inner rim 2 is provided with an opening 18, in which a tension bolt 19 is seated, that portion of the bolt within the opening 18 being free from threads, while the remaining portion is provided with screw threads adapted to intermesh with the screw-threaded opening 15 of the tension bar 13, as clearly illustrated in Fig. 2.

With the parts assembled as shown in Fig. 2, any desired tension may be placed upon the spring 10 by manipulating bolt 19, whereby the tension bar 13 is moved toward or away from the inner rim, thus putting more or less tension on the spring 10 by reason of the fact that this spring is connected to the tension bar through the eyes or hooks 12 of the spring.

My invention may be utilized in connection with any wheel having an outside detachable rim, in which case the inside metallic inner rim is provided with a countersink 20 in which the head of the bolt 19$^a$ is positioned, as shown in Fig. 4. While I prefer to mount two springs between each pair of spokes, as shown in Fig. 1, at the same time it will be understood that I may employ but one spring between each pair of spokes, by using a larger and stronger spring. The springs and the side plates 9 take up the side thrusts of the wheel, and while there will be very little vibration from side to side in the wheel, yet the maximum amount of flexibility will be obtained.

The construction of this wheel is such that the weight of the car or vehicle is suspended from the top and sides of the wheel, thus relieving the springs at the bottom of the wheel of the maximum weight, whereby they are free to absorb shocks.

I claim:—

1. In a wheel, the combination with an outer rim having an inwardly extending flange at each edge, a guard-plate on each side of said rim and extending inwardly toward the center of the wheel, and a bolt securing said plates to said flanges, and extending across the rim, of a coiled spring having diametrically opposite eyes at each end formed in the top and bottom coils thereof, the eyes of the top coil being seated on said bolt, a bar on which the eyes of the lower coil are seated, said bar having a screw threaded opening, an inner rim, and a bolt anchored in the inner rim and constructed to have a threaded engagement with the opening in said bar, whereby the tension of the spring may be regulated.

2. In a wheel, the combination with an outer rim having an inwardly extending flange at each edge, and a bolt secured to said flanges and extending across the rim, seats formed in said bolt near said flanges, of a coiled spring having diametrically opposite eyes at each end formed in the top and bottom coils thereof, the eyes of the top coil being seated in the seats of said bolt, a bar having seats in which the eyes of the lower coil are seated, said bar having a screw-threaded opening, and a bolt anchored in the inner rim and constructed to have a threaded engagement with the opening in said bar, whereby the tension of the spring may be regulated.

The foregoing specification signed at Miami, Florida, this 30th day of January, 1912.

MITCHELL D. PRICE.

In presence of—
L. R. RAILEY,
B. P. CROWELL.

Copies of this patent may be obtained for five cents each, by addressing the "Commissioner of Patents, Washington, D. C."